UNITED STATES PATENT OFFICE.

LIZZIE E. BRADY, OF GATESVILLE, NORTH CAROLINA, ASSIGNOR TO HERSELF, JOHN BRADY, AND ANNESIA LANGSTUN, OF SAME PLACE.

IMPROVEMENT IN PILE REMEDIES.

Specification forming part of Letters Patent No. 128,784, dated July 9, 1872.

Specification describing a new and useful Improvement in Pile Remedy, invented by LIZZIE E. BRADY, of Gatesville, in the county of Gates and State of North Carolina.

The object of this invention is to provide a remedy for that painful disease the "piles;" and it consists in a compound composed of the ingredients hereinafter named, combined in about the proportions specified, viz: To three-fourths of an ounce of pure water I add one-fourth of an ounce of tincture of opium and one-half ounce of select gum-arabic.

The mode of preparation is to mix the tincture of opium with the water; then dissolve the gum-arabic therein over a slow heat. When the gum-arabic is dissolved and the ingredients are thoroughly mixed together and cooled the composition is ready for use. The application is made directly to the affected part. A syringe may be used for internal piles.

I do not confine myself to the precise proportions named, as they may be varied without departing from my invention.

Having thus described my invention, I claim as new and desire to secure by Letters Patent—

A pile remedy, consisting of the above-named ingredients, substantially as described.

LIZZIE EVERETT BRADY.

Witnesses:
M. L. EWER,
J. E. WOOD.